United States Patent [19]

Ballert

[11] 4,404,358
[45] Sep. 13, 1983

[54] RESOLE COMPOSITIONS AND LAMINATES MADE THEREFROM

[75] Inventor: Bruce Q. Ballert, Coshocton, Ohio

[73] Assignee: General Electric Company, Schenectady, N.Y.

[21] Appl. No.: 202,310

[22] Filed: Oct. 30, 1980

Related U.S. Application Data

[63] Continuation of Ser. No. 962,024, Nov. 20, 1978, abandoned.

[51] Int. Cl.$^3$ .............................................. C08G 8/32
[52] U.S. Cl. ............................. 528/158.5; 428/531; 528/146; 528/152; 528/155; 528/161
[58] Field of Search ................... 428/531; 524/594; 528/158.5, 152, 146, 155, 161

[56] References Cited

U.S. PATENT DOCUMENTS

| | | | |
|---|---|---|---|
| 2,563,614 | 8/1951 | Palmer | 528/158.5 |
| 2,744,013 | 5/1956 | Dorland et al. | 528/158.5 |
| 3,920,594 | 11/1975 | Sato et al. | 528/158.5 |
| 4,043,954 | 8/1977 | Claybaker | 528/158.5 |
| 4,043,970 | 8/1977 | Dahms | 428/531 |
| 4,109,057 | 8/1978 | Nakamura et al. | 428/531 |
| 4,158,650 | 6/1979 | Kato et al. | 528/158.5 |

FOREIGN PATENT DOCUMENTS

| | | | |
|---|---|---|---|
| 664443 | 6/1963 | Canada | 528/158.5 |
| 49-24252 | 3/1974 | Japan | 428/531 |
| 51-109966 | 9/1976 | Japan | 428/531 |
| 7214280 | 6/1973 | Netherlands | 428/531 |

OTHER PUBLICATIONS

Ellis, The Chemistry of Synthetic Resins, vol. 1, Reinhold Publ., 1935, p. 402.

*Primary Examiner*—Ronald W. Griffin
*Attorney, Agent, or Firm*—Hedman, Casella, Gibson, Costigan & Hoare

[57] ABSTRACT

The invention relates to oil-modified resole varnishes particularly useful for impregnating paper laminates. Specifically, the invention relates to such compositions in which linseed oil or mixtures thereof with tung oil or oiticica oil is used as the modifier for the resole. Laminates prepared using the varnish are characterized by manufacturing economy, enhanced punchability and other salutary properties.

9 Claims, No Drawings

RESOLE COMPOSITIONS AND LAMINATES MADE THEREFROM

This is a continuation of application Ser. No. 962,024 filed Nov. 20, 1978, now abandoned.

This invention relates to oil-modified resole varnishes. More particularly, the invention relates to such varnishes which are prepared using linseed oil alone or in combination with tung oil or oiticica oil as the modifier for the resole and to laminates prepared using varnishes containing the resoles as impregnants.

BACKGROUND OF THE INVENTION

The preparation of oil-modified phenolic resole varnishes or phenol aldehyde resole varnishes is well known. Typically, a phenol moiety such as phenol, cresylic acid or other similar material and mixtures thereof is mixed with tung or chinawood oil or oiticica oil in the presence of a strong acid such as concentrated sulfuric acid or phosphoric acid, the alkylated oil and then being reacted in a suitable solvent usually alcohol, with an aldehyde moiety in the presence of amine or base material which serves to neutralize the excess strong acid and catalyze the resole formation.

These resole varnishes based on either tung oil or oiticica oil have for many years been used in room temperature punchable paper-based laminates with the NEMA designations XXXPC or FR-2. Illustrative of the state of the art is Claybaker, U.S. Pat. No. 4,043,954, assigned to the assignee of this application, and incorporated herein by reference.

It has been thought that tung oil and oiticia oils are uniquely suitable as modifiers for resoles used as impregnants in room temperature punching laminates with excellent electrical properties, possibly because they possess a high degree of conjugated unsaturation. Recently, however, demand has exceeded supply of these oils and efforts have been made to secure replacements. Surprisingly it has been found that linseed oil can serve to replace all or part of the tung or oiticica oils in such resoles despite the fact that the polyunsaturates in linseed oil are predominately non-conjugated. More specifically, linseed oil is a mixture of triglycerides, isolated by crushing and solvent extraction of flax seed, comprising typically 6% palmitic, 3.5% stearic, 20% oleic, 14.5% linoleic and 56% linolenic glycerides, with a Wijis iodine value of 180-195. The linoleic moiety is the non-conjugated isomer of the conjugated elaeostearic glyceride present in tung oil.

Mention is made of the teachings of Dorland et al, U.S. Pat. No. 2,744,013, in which the suggestion is made that drying oils such as linseed oil, perilla oil, tung oil or mixtures thereof may be used in combination with phenolic resins to make hardboard with enhanced physical strength and moisture resistance. In contrast to the laminating resins with which this invention is concerned, the drying oil component of the Dorland et al system is not used to modify the phenolic resin, but rather is used to impregnate the surface of the hardboard after the resin has been used to coat the wood fibers for consolidation under heat and pressure. Mention is also made of the teachings of Ellis in The Chemistry of Synthetic Resins, Vol. I, Reinhold Publ., 1935, page 402, and particularly footnote 69, which refers to an abstract of German Patent No. 534,784. The abstract describes solid resinous products formed by heat reacting linseed or wood oil with phenols, cresols, etc. and then with formaldehyde in the presence of bases.

In essence, it has been discovered that linseed oil can replace 20-100%, preferably 40-60%, of the tung oil or oiticica oil in resole varnishes now used in the laminating art, with entirely acceptable laminating use properties (stroke cures at 150° C. are in the range of 140°200 seconds). Unexpectedly, paper laminates prepared from the new varnishes have improved properties, especially punchability after thermal aging.

DESCRIPTION OF THE INVENTION

According to this invention, there are provided laminating varnishes by a process comprising preparing an oil-modified resole by (a) reacting a phenol moiety with a drying oil comprising (i) from about 20 to about 100 parts by weight of linseed oil and (ii) from about 80 to about 0 parts by weight of tung oil, oiticia oil or a mixture thereof in a presence of a strong acid and (b) reacting the product of (a) in an alcohol solvent with an aldehyde moiety in the presence of an amine catalyst.

In preferred embodiments, the linseed oil comprises from 40 to 60 parts by weight and the tung oil comprises from 60 to 40 parts by weight of the drying oil.

The preparation of resoles can be carried out conventionally. Typically, phenol, cresol, cresylic acid or mixtures thereof in any proportion are combined with a concentrated acid such as sulfuric acid or phosphoric acid and heated to a temperature of approximately 35° C., there then being added over a suitable period the drying oil, the amounts of ingredients being such that the acid constitutes, by weight, from about 0.3 to 1 percent of the total mixture and the drying oil constitutes, by weight, from about 15 to 40 percent of the total mixture, the remainder being the phenol moiety. The mixture of the phenol, acid and oil is heated at a temperature of from about 70° C. to about 250° C., preferably 115° C. to 120° C., for from about 10 to about 180 minutes, typically about 30 minutes, and cooled to about 90° C. at which point 20 to 34 parts of alcohol, e.g., methanol, ethanol, 2-propanol, mixtures thereof, etc., is added per 100 parts of the other ingredients. The mixture is then cooled to a temperature of about 65° C. at which point an amine, such as ethylene diamine, 1,3-propane diamine, hexamethylene tetramine, etc., is added followed by the addition preferably of paraformaldehyde in the amount of 19 to 20 parts by weight per 100 parts by weight of the remainder of the ingredients. At this point the mixture is again heated to reflux temperature and held there for a period of about one hour, at which point the stroke cure is checked and adjusted by further reaction if necessary, the mixture finally being cooled with the addition of final solvent to the desired viscosity and specific gravity. Typically, methyl alcohol in the amount of about 9 parts by weight is used for each 100 parts by weight of resole reaction product.

While paraformaldehyde is used as the aldehyde moiety, it will be realized that other non-water-containing aldehydes can be used, such as methyl and propyl formcels, which are solutions of formaldehyde in the corresponding methyl or propyl alcohol. Formaldehyde as such is not preferred since it contains water, the excess of which then has to be removed.

The linseed oil is preferably raw or alkali refined.

DESCRIPTION OF THE PREFERRED EMBODIMENTS

The following examples illustrate the present invention, but are not to be construed to limit the claims in any manner whatsoever. All parts are by weight.

EXAMPLE 1

After a mixture of 1400 g. of synthetic phenol (Allied Chemical) and 14.1 g. of reagent grade concentrated sulfuric acid (98% pure) is heated to 120° C. under nitrogen, 874 g. of raw linseed oil is added in one portion. The reaction mixture is then heated to 160±2° C., and this temperature is maintained for one hour. After the mixture is allowed to cool to 75° C., 586 g. of 2-propanol is added. This addition is followed by one of 32 g. of ethylene diamine. The reaction is stirred for 5 minutes and then 640 g. of paraformaldehyde (92% pure) is added. After 1.0 hours at reflux, a stroke cure at 150° C. of 178 seconds is reached.

EXAMPLE 2

To a hot (125° C.) mixture of 33.0 lbs. of synthetic phenol and 166 g. of concentrated sulfuric acid is added, in one portion, 10.0 lbs. of raw linseed oil. The reaction mixture is heated to 160° C. and this temperature is maintained for 0.5 hours. Then the reaction mixture is cooled to 145° C., and 10.0 lbs. of tung oil is added in one portion. The temperature is maintained between 145° C. and 154° C. for 0.25 hrs. After the mixture has been cooled to 70° C., 15.5 lbs. of methanol is added and at 60° C., 524 g. of ethylene diamine is added. After the reaction mixture has been stirred for five minutes, 14.4 lbs. of paraformaldehyde is added, the mixture brought to reflux and released for 0.5 hours. The stroke cure at 150° C. is 161 seconds and the varnish is then cooled to room temperature (about 23° C.).

EXAMPLE 3

To a hot (125° C.) mixture of 31.25 lbs. of synthetic phenol, 9.2 lbs. of m,p-90 cresol and 178 g. of concentrated sulfuric acid is added, in one portion, 12.1 lbs. of raw linseed oil. The temperature of the reaction mixture is maintained between 120° C. and 125° C. for 1.0 hours. Subsequently, 12.1 lbs. of tung oil is added in one portion and the temperature is maintained between 125° C. and 130° C. for 0.25 hours. After the reaction mixture has been cooled to 90° C., 16.3 lbs. of 2-propanol is added. When the reaction mixture has cooled to 60° C., 356 g. of ethylene diamine is added, stirring is continued for 5 minutes and 17.8 lbs. of paraformaldehyde is added. The mixture is refluxed for 0.5 hrs. and cooled. The stroke cure at 150° C. is between 130 and 170 seconds.

EXAMPLE 4

A mixture of 1125 parts of phenol, 325 parts of cresylic acid, and 14.1 parts of concentrated sulfuric acid is heated with stirring to 120° C. At this temperature, 656 parts of raw linseed oil is added and the temperature is maintained between 120° C. and 130° C. for 1.0 hours. At this point, 218 parts of tung oil is added at 124° C. and the reaction mixture is stirred for 0.25 hours, then it is cooled. When the temperature of the reaction mixture reaches 65° C., 586 parts of 2-propanol is added. This addition is followed by one of 30 parts of ethylene diamine. After the reaction mixture has been stirred for 5 minutes, 640 parts of paraformaldehyde is added and the reaction mixture is brought to reflux. After 1 hour at reflux, a stroke cure in the acceptable range (120–168 seconds at 150° C.) is realized and the mixture is diluted with 430 parts by methanol to yield a clear, homogeneous varnish.

To make laminates, cotton linters paper webs are impregnated with the resins of Examples 2–4 and dried in an oven to a predetermined resin flow. Several plies of the impregnated paper are stacked, covered with copper foil, and pressed between stainless steel pans at high temperature and pressure. This results in paper based laminates with excellent room temperature punching and good electrical properties.

EXAMPLE 5

The varnish of Example 3, 1190 parts, is combined with 20 parts of triphenyl phosphate, and 60 parts of antimony trioxide as flame retardant materials along with about 100 parts of a barium hydrate-catalyzed phenol-formaldehyde resin of low viscosity to facilitate penetration of the paper along with about 220 parts of an epoxy resin prepared from tetrabromobisphenol-A having a molecular weight of about 1100 and enough acetone (3 to 30 parts) to adjust the viscosity. When four layers of 22 mil thick cotton linters or bleached kraft paper are impregnated, as by brushing, dipping, or the like, to a dried resin content of 60% and consolidated with a copper foil outer layer at a pressure of about 1350 psi and a temperature of about 150° C. for about 30 minutes, laminates having properties shown in the Table are obtained:

TABLE

Properties Of Laminates Based On 1/1 Linseed/Tung Oil Resole Varnish

| Property | Test Method | Test Value |
|---|---|---|
| Water Absorption | NEMA LI-1-10.17 Test 24/23 | 0.52% |
| Flexural Strength | NEMA LI 1-10.20 | |
| Lengthwise | | 20,600 psi |
| Crosswise | | 16,500 psi |
| Flammability | UL-94 | V-O |
| Insulation Resistance | ASTM EIA C-96/35/90 | 629,000 megohms |
| Dielectric Strength, parallel, D48/50 | NEMA LI 1-10.18 | |
| S/T | | 74 kv |
| S/S | | 67 kv |
| Peel Strength after 10 second float on 500° C. solder | NEMA LI 1-10.14 | 980 lbs./in. |
| Seconds to blister at 500° F. | NEMA LI 1-10.13 | 39 seconds |
| Solvent Resistance to 10 minute immersion in 1,1,2-trichloroethylene | | No effect |
| to 5 minute immersion in methyl ethyl ketone | | No effect |

In addition to excellent parallel dielectric strength, these laminates showed a marked decrease in the amount of cracking after thermal aging when subjected to standard punching procedures.

EXAMPLE 6

To a mixture of 1125 g. of synthetic phenol, 325 g. of mp-90 cresol, and 16.9 of sulfuric acid is added at 125° C., 454 g. of alkali refined linseed oil. The reaction mixture is heated to 160° C. and this temperature is maintained for 0.5 hours. After 0.5 hours at 160° C., the reaction mixture is cooled to 150° C. and 454 g. of tung oil is added. The reaction mixture is stirred at 140°–150° C. for 15 minutes, then cooled at 70° C. A mixture of 417 g. of methanol and 232 g. of 2-propanol is added. This addition is followed by one at 60° C. of 52.4 g. of ethylene diamine. After the reaction mixture has been stirred for 5 minutes, 656 g. of paraformaldehyde is added and the reaction mixture is heated to reflux. After 0.5 hours at reflux, a stroke cure at 150° of 156 seconds is observed.

Laminates with XXXP characteristics are prepared from this resin, and they have acceptable properties.

It can be seen that the present invention provides resole materials which are readily made from economical and available oils. There are also provided useful cold punching laminates using such resole varnishes as impregnants. Minor variations will suggest themselves to those skilled in this art in light of the above, detailed description. All such obvious variations are within the full intended scope of the appended claims.

What is claimed is:

1. In the process of preparing an oil modified resole laminating varnish by (a) reacting a phenol moiety with a drying oil in the presence of a strong acid, (b) reacting the product of (a) in an alcohol solvent with an aldehyde moiety in the presence of an amine catalyst and (c) adding a solvent, the improvement which consists of using a drying oil comprising (i) about 1 part by weight of linseed oil and (ii) about 1 part by weight of tung oil.

2. A process as defined in claim 1 wherein said linseed oil is raw linseed oil.

3. A process as defined in claim 1 wherein said linseed oil is alkali-refined linseed oil.

4. A process as defined in claim 1 wherein said phenol moiety is phenol, or a mixture of phenol with cresol.

5. A process as defined in claim 1 wherein said acid is selected from sulfuric, phosphoric or para-toluene sulfonic acid.

6. A process as defined in claim 1 wherein said aldehyde moiety is paraformaldehyde.

7. A process as defined in claim 1 wherein said amine is selected from 1,3-propane diamine and ethylene diamine.

8. The product prepared by the process of claim 1.

9. A laminate comprising a plurality of sheet-like paper webs saturated with the varnish defined in claim 1 and consolidated under heat and pressure into a unitary composite structure.

* * * * *